(12) United States Patent
Bortz

(10) Patent No.: US 8,337,608 B2
(45) Date of Patent: Dec. 25, 2012

(54) SOY ESTER BASED MULTI-PURPOSE SOLVENT

(76) Inventor: Steven H. Bortz, Westlake Village, CA (US)

( * ) Notice: Subject to any disclaimer, the term of this patent is extended or adjusted under 35 U.S.C. 154(b) by 112 days.

(21) Appl. No.: 13/083,319

(22) Filed: Apr. 8, 2011

(65) Prior Publication Data

US 2011/0183882 A1 Jul. 28, 2011

Related U.S. Application Data

(63) Continuation-in-part of application No. 12/837,980, filed on Jul. 16, 2010, and a continuation-in-part of application No. 11/450,726, filed on Jun. 9, 2006, now Pat. No. 7,785,413.

(60) Provisional application No. 60/690,382, filed on Jun. 10, 2005.

(51) Int. Cl.
*C09D 7/00* (2006.01)
*C11D 7/60* (2006.01)
*C11D 1/825* (2006.01)

(52) U.S. Cl. .................. 106/311; 510/437; 510/434

(58) Field of Classification Search .................. 106/311; 510/434, 437
See application file for complete search history.

(56) References Cited

U.S. PATENT DOCUMENTS

| 3,192,061 | A | 6/1965 | Wilson et al. |
| 5,340,495 | A | 8/1994 | Mulcahy et al. |
| 6,017,862 | A | 1/2000 | Doyel et al. |
| 6,720,366 | B1 | 4/2004 | Torbus et al. |
| 7,785,413 | B2 | 8/2010 | Bortz |
| 2004/0063042 | A1 | 4/2004 | Egbe |
| 2012/0137449 | A1* | 6/2012 | Ransom et al. ............. 12/146 B |
| 2012/0175562 | A1* | 7/2012 | Howard et al. ............... 252/364 |
| 2012/0220511 | A1* | 8/2012 | Dabela et al. ................ 510/171 |

FOREIGN PATENT DOCUMENTS

| JP | 15114540 | 4/2003 |
| KR | 10-2000-63944 | 11/2000 |
| KR | 10-2004-36038 | 4/2004 |

* cited by examiner

*Primary Examiner* — David M Brunsman
(74) *Attorney, Agent, or Firm* — Kenneth L. Green

(57) ABSTRACT

A multi-purpose solvent includes a soy ester material and includes less than 25 Grams Per Liter (GPL) of Volatile Organic Compound (VOC) rating which permits the multi-purpose solvent to be used for cleaning in government regulated areas. The desire to reduce VOCs is well recognized. The multi-purpose solvent of the present invention performs as well as known cleaning products (for example, xylene or MEK) having greater than 25 grams per liter VOC products. Further, the multi-purpose solvent according to the present invention has less than one tenth of the hazardous ingredients present in the other multi-purpose solvents. The multi-purpose solvent is suitable for reducing water and oil based coatings and material and may be used as a cleaner or thinner.

4 Claims, No Drawings

SOY ESTER BASED MULTI-PURPOSE SOLVENT

The present application claims the benefit of U.S. Provisional Patent Application Ser. No. 60/690,382 filed Jun. 10, 2005 and is a Continuation In Part of U.S. patent application Ser. No. 11/450,726 filed Jun. 9, 2006, now U.S. Pat. No. 7,785,413, and a Continuation In Part of U.S. patent application Ser. No. 12/837,980 filed Jul. 16, 2010, which applications are incorporated in their entirety herein by reference.

BACKGROUND OF THE INVENTION

The present invention relates to low vapor pressure multi-purpose solvents and in particular to a soy ester based multi-purpose solvent containing less than 25 Grams Per Liter (GPL) of Volatile Organic Compounds (VOCs).

Many known multi-purpose solvents used to remove paint, gum, tar and the like off carpet, tile, concrete, and various surfaces, contain hazardous ingredients such as Methyl Ethyl Ketone (MEK), xylene, isopropyl alcohol, methanol, mak, butyl cellusolve, petroleum naptha, and toluene. While such multi-purpose solvents containing such ingredients perform adequately, the use of these hazardous ingredients is a major disadvantage, and multi-purpose solvents containing such ingredients are prohibited in government regulated areas when they include more than 25 GPL of VOCs. While acetone alone can be used as a multi-purpose solvent, it is too volatile for many surfaces when used alone. In hot areas, if acetone, for example, is applied to clean a surface, it can dry before completing the intended cleaning. Further, many multi-purpose solvents are flammable and present a significant risk of fire. Because multi-purpose solvents are widely used, a non-flammable multi-purpose solvent providing less than 25 GPL of VOCs is needed.

BRIEF SUMMARY OF THE INVENTION

The present invention addresses the above and other needs by providing a multi-purpose solvent which includes a methyl soy ester and satisfies a less than 25 Grams Per Liter (GPL) Volatile Organic Compound (VOC) rating which permits the multi-purpose solvent to be used for cleaning and thinning in government regulated areas. Requirements for reducing VOCs are well recognized. The multi-purpose solvent of the present invention performs as well as products (for example, hydrocarbon based multi-purpose solvents) having greater than 25 grams per liter VOC products. Further, the multi-purpose solvent according to the present invention has less than one tenth of the hazardous ingredients present in the other multi-purpose solvents.

In accordance with one aspect of the invention, there is provided a soy ester based multi-purpose solvent comprising between 10 percent and 20 percent by weight of Dibasic Ester (DBE) between 60 percent and 70 percent by weight of methyl soy ester and between 5 percent and 30 percent by weight of Oxsol® 100 (Parachlorobenzotrifluoride or PCBTF).

In accordance with another aspect of the invention, there is provided a soy ester based multi-purpose solvent comprising 10 percent and 20 percent by weight of SG5000E (soy product miscible with water), 40 percent and 60 percent by weight of SG1000E (soy product miscible with water) 5 percent and 30 percent by weight of Oxsol® 100 (Parachlorobenzotrifluoride or PCBTF).

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

The South Coast Air Quality Management District (South Coast AQMD) has adopted the most stringent air quality regulations in the United States. Based on South Coast AQMD guidelines, multi-purpose solvents are required to have less than 25 Per Liter (GPL) of Volatile Organic Compounds (VOCs). The multi-purpose solvent according to the present invention has the ability to satisfy most cleaning needs and contains less than 25 GPL of VOCs.

The multi-purpose solvent of the present invention includes the following essential ingredients:
1) between 10 percent and 20 percent by weight of Dibasic Ester (DBE);
2) between 60 percent and 70 percent by weight of methyl soy ester; and
3) between 5 percent and 30 percent by weight of Parachlorobenzotrifluoride (PCBTF)

Preferred methyl soy ester materials comprising a soy based emulsion are sold under the trademarks SG5000E and SG1000E by Soy Technologies, LLC of Nichokasville, Ky. 40356. This soy based ester is a combination of soybean methyl esters dibasic esters and triethanolamine. The soy based methyl ester is a mixture of hexadecanoic acid, octadecanoic acid, 9-octadecenoic acid (Z)-, 9, 12-Octadecadienoic acid (Z,Z)- and 9. 12, 15-Octadecatrienoic acid (9Z. 12Z. 15Z). The dibasic ester is a mixture of dimethyl glutarate, dimethyl adipate and dimethyl succinate.

The multi-purpose solvent of the present invention may be conveniently produced from a combination comprising 10 percent and 20 percent by weight of SG5000E (soy product miscible with water), 40 percent and 60 percent by weight of SG1000E (soy product miscible with water) 5 percent and 30 percent by weight of Oxsol® 100 (0 voc xylene type product). The resulting multi-purpose solvent is useful for cleaning and removing unwanted material, and has less than 25 GPL of VOCs.

When used as a cleaner, the multi-purpose solvent leaves a barrier which helps prevent rust on metal and extends the life of a natural bristle brush or lamb's wool roller. The multi-purpose solvent at the same time complies with government air regulations and is very beneficial to the environment.

While the invention herein disclosed has been described by means of specific embodiments and applications thereof, numerous modifications and variations could be made thereto by those skilled in the art without departing from the scope of the invention set forth in the claims.

I claim:

1. A multi-purpose solvent providing less than 25 grams per liter of Volatile Organic Compound (VOC), the multi-purpose solvent comprising:
   between 10 percent and 20 percent by weight of Dibasic Ester (DBE);
   between 60 percent and 70 percent by weight of methyl soy ester; and
   between 5 percent and 30 percent by weight of Parachlorobenzotrifluoride (PCBTF).

2. A multi-purpose solvent providing less than 25 grams per liter of Volatile Organic Compound (VOC), the multi-purpose solvent consisting essentially of:
   between 10 percent and 20 percent by weight of Dibasic Ester (DBE);
   between 60 percent and 70 percent by weight of methyl soy ester; and between 5 percent and 30 percent by weight of Parachlorobenzotrifluoride (PCBTF).

3. The multi-purpose solvent of claim 2, where the between 10 percent and 20 percent by weight of Dibasic Ester (DBE) and between 60 percent and 70 percent by weight of methyl soy ester consist essentially of:

between 10 percent and 20 percent by weight of a soy product miscible with water and including Dibasic Ester; and between 40 percent and 60 percent by weight of a soy product miscible with water and not including Dibasic Ester.

4. A multi-purpose solvent providing less than 25 grams per liter of Volatile Organic Compound (VOC), the multi-purpose solvent comprising:

between 10 percent and 20 percent by weight of a soy product miscible with water and including Dibasic Ester;

between 40 percent and 60 percent by weight of a soy product miscible with water and not including Dibasic Ester; and between 5 percent and 30 percent by weight of Parachlorobenzotrifluoride (PCBTF).

* * * * *